(No Model.)

C. C. PLAISTED.
BICYCLE SUPPORT.

No. 602,141.  Patented Apr. 12, 1898.

Witnesses:
Harris E. Hart.
Arthur B. Jenkins.

Inventor
Charles C. Plaisted,
By Chas. L. Burdett,
Attorney

UNITED STATES PATENT OFFICE.

CHARLES C. PLAISTED, OF HARTFORD, CONNECTICUT.

BICYCLE-SUPPORT.

SPECIFICATION forming part of Letters Patent No. 602,141, dated April 12, 1898.

Application filed March 9, 1897. Serial No. 626,642. (No model.)

*To all whom it may concern:*

Be it known that I, CHARLES C. PLAISTED, a citizen of the United States, and a resident of Hartford, in the county of Hartford and State of Connecticut, have invented certain new and useful Improvements in Bicycles, of which the following is a full, clear, and exact description, whereby any one skilled in the art can make and use the same.

The object of my invention is to provide a bicycle or like vehicle with means of self-support for holding the machine in an upright position, the devices for accomplishing this purpose being so constructed as to occupy a very small space when not required for use and within a tubular part of the frame of the vehicle.

To this end my invention consists in the details of the several parts making up the device as a whole and in the combination of such parts, as hereinafter described, and more particularly set out in the claims.

Figure 1:
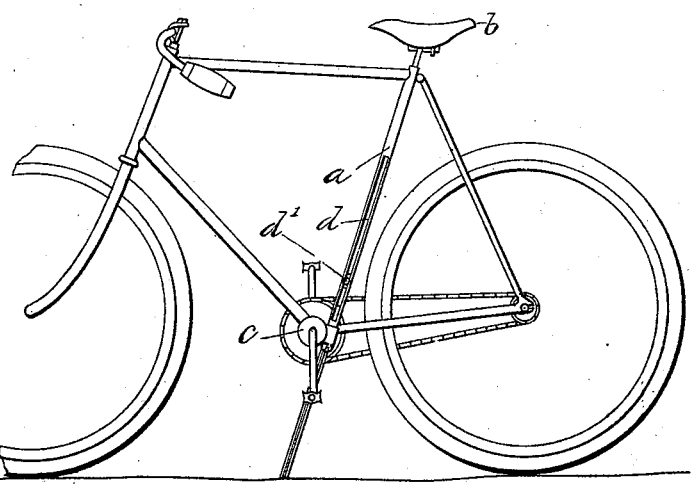
Figure 2:
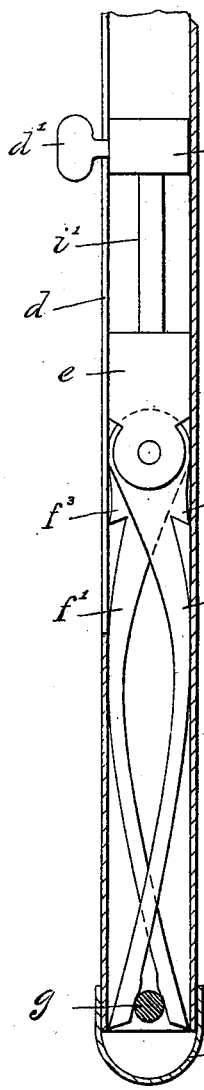
Figure 3:
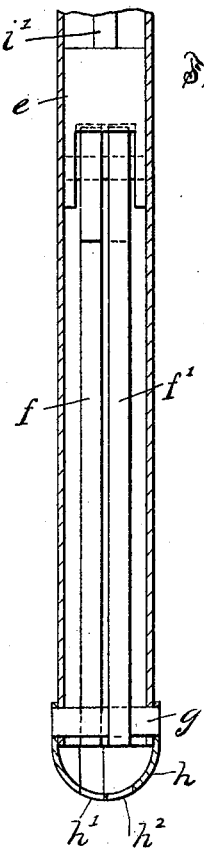
Figure 4:
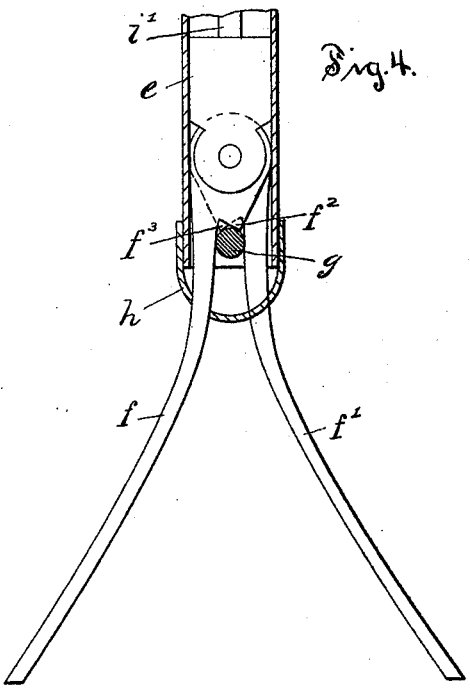

Referring to the drawings, Figure 1 is a side view of the frame of a bicycle, showing my improvement attached thereto and in position for supporting the machine. Fig. 2 is a detail view, on enlarged scale, in central vertical section, of a portion of the down-tube of a bicycle with my improvement located therein in its closed position. Fig. 3 is a like view in a plane at right angles to the plane of view of Fig. 2. Fig. 4 is a view similar to that of Fig. 2 with the device extended.

In the accompanying drawings the letter $a$ denotes the center tube of a bicycle, to the upper end of which the saddle-post supporting the saddle $b$ is secured.

The letter $c$ denotes the crank-shaft bracket, to which on one side of the center the lower end of the center tube $a$ is secured in such manner that the legs projecting from the inside of the tube will not interfere with the working parts of the mechanism. A carrier fitting closely the inside wall of the tube is capable of free movement lengthwise of the tube. To the lower end of the carrier the legs $f\ f'$, curving in opposite directions, are pivoted, preferably, on a common pivot. These legs have projections $f^2\ f^3$ near the tops, forming stop-shoulders that engage a pin $g$, fastened near the bottom of the tube, forming a stop to limit the downward movement of the legs.

A cap $h$, secured to and covering the lower end of the tube $a$, is provided with slots $h'\ h^2$, through which the legs slide. This piece $i$ is used simply to provide a longer bearing for the carrier, secured thereto by any convenient means, as interengaging screw-threaded parts on the stem $i'$ and carrier $e$. A thumb-piece $d'$ is secured to the bearing $i$ in any suitable manner and projects through a slot $d$ in the wall of the center-tube $a$.

When not in use, the legs are drawn up into the tube by means of the thumb-piece, one leg overlying and crossing the other, as shown in Fig. 2 of the drawings. The pin $g$ is always in contact with one edge of both legs, and the legs, pressing against the sides of the tube near the bottom and at their point of greatest curve, prevent any chance of the parts rattling. This pin forms a stop to limit the downward movement of the legs and a guide to control their lateral movements.

When required for use, the thumb-piece is pressed down, and the legs, projecting through the slots in the cap, curve outward and present a broad base, forming an extremely stable support.

The projections $f^2\ f^3$ on the legs coming in contact with the pin $g$ limit the downward movement and the spread of the legs.

It is to be noted that the legs or braces are exact counterparts each of the other, and the pivoting of these legs on a common pivot centrally of the carrier, with the curves in the legs oppositely arranged, so that the lower portion projects outward, provides a device that may be inclosed within a very small space and yet one in which the distance between the lower ends of the legs, when the latter are extended, is great enough to firmly support the bicycle.

I claim as my invention—

1. In combination with a bicycle having a tubular frame member with its lower end open, a sliding carrier located in said tube, curved legs pivoted to said carrier and crossed when within the tube, a guide-pin located between the legs near the lower end of the tube, each of said legs held within the tube by yielding pressure and having a stop-shoulder coöperating with the guide-pin when the legs are extended, and means for moving the carrier, all substantially as described.

2. In combination with a bicycle having a tubular frame member $a$ with an open lower end, a reciprocating carrier $e$ located in said tube, curved yielding legs $f, f'$, pivoted to said carrier and crossed when within the tube, stop-shoulders $f^2$, $f^3$, on said legs, a guide-pin $g$ fixed across the tube near its lower end and located between the said legs, each leg when within the tube making contact with the opposite inner walls whereby it is held with a yielding grasp against movement, and the means for reciprocating the carrier, all substantially as described.

3. In combination with a bicycle having a tubular frame member with its lower end open, a perforated cap partly covering the lower end, a reciprocating carrier located in said tube, curved legs pivoted to said carrier and crossed when within the tube, a guide-pin located between said legs near the lower end of the tube, each of said legs having a stop-shoulder coöperating with the guide-pin when the legs are extended, means for holding the legs within the tube, and means for reciprocating the carrier, all substantially as described.

CHARLES C. PLAISTED.

Witnesses:
CHAS. L. BURDETT,
ARTHUR B. JENKINS.